Jan 6, 1931.  P. ASMUSSEN  1,787,466
AUTOMATIC TRANSMISSION
Filed June 26, 1930   3 Sheets-Sheet 1
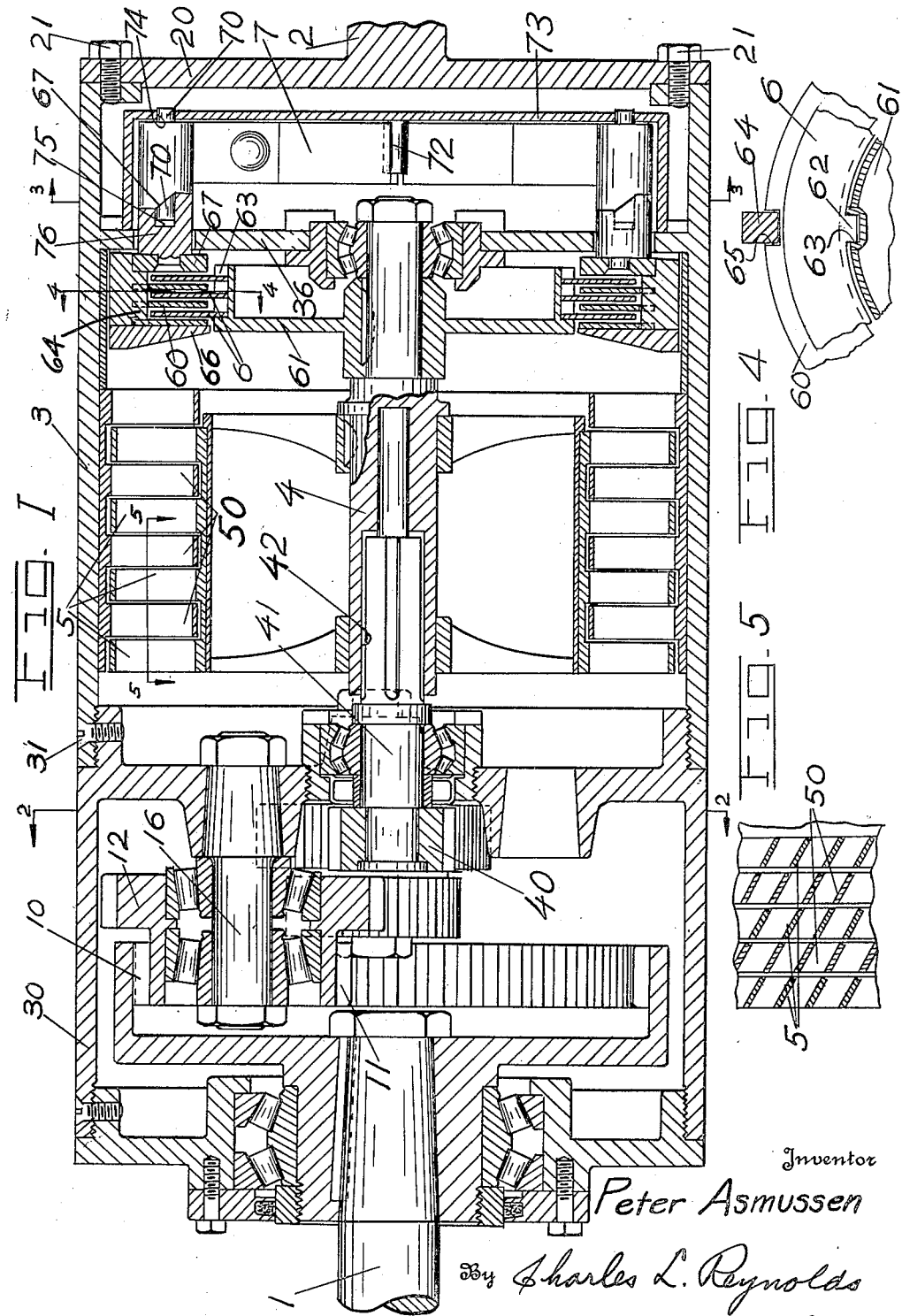
Inventor
Peter Asmussen
By Charles L. Reynolds
Attorney Jan 6, 1931.  P. ASMUSSEN  1,787,466
AUTOMATIC TRANSMISSION
Filed June 26, 1930  3 Sheets-Sheet 2
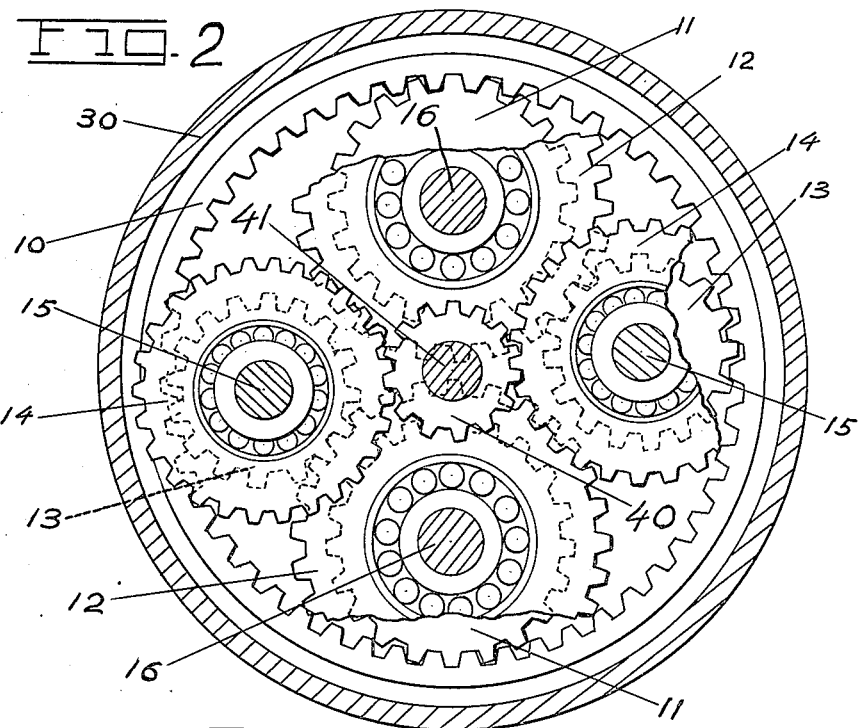
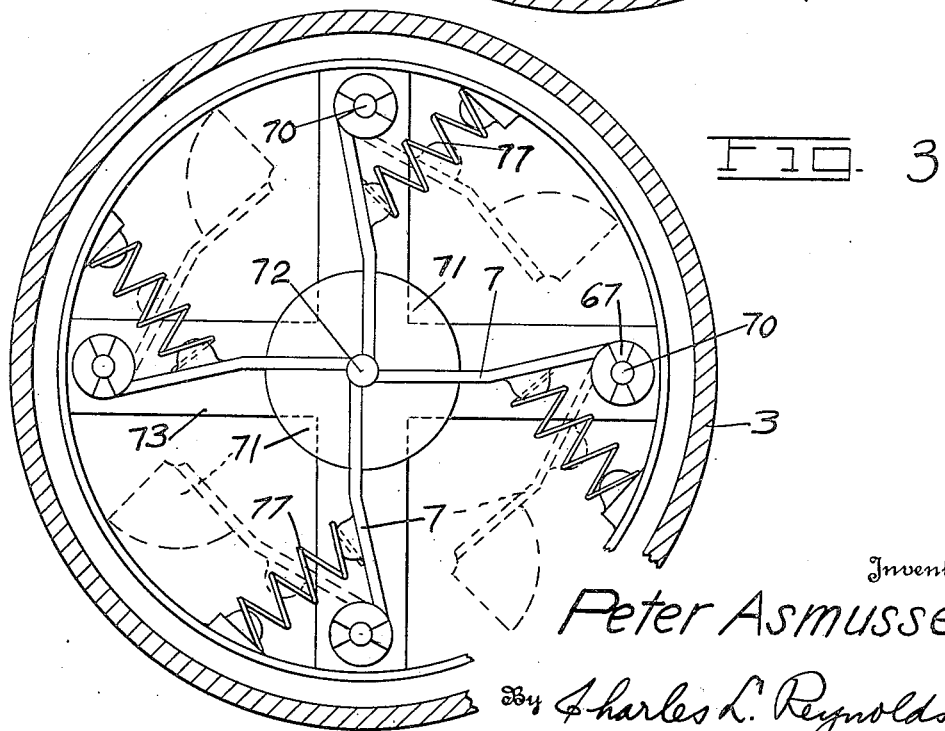
Inventor
Peter Asmussen
By Charles L. Reynolds
Attorney

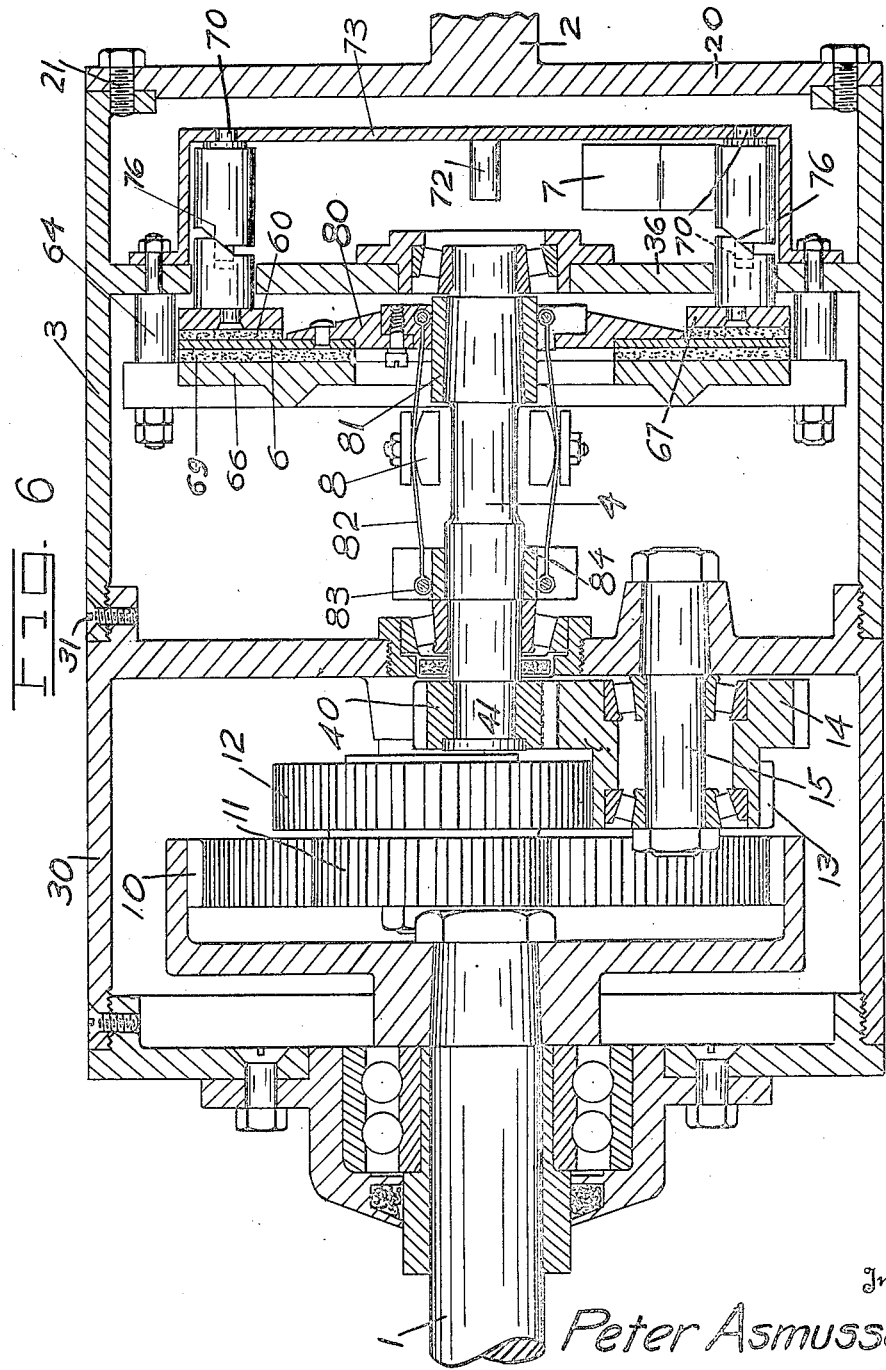

Patented Jan. 6, 1931

1,787,466

UNITED STATES PATENT OFFICE

PETER ASMUSSEN, OF SEATTLE, WASHINGTON

AUTOMATIC TRANSMISSION

Application filed June 26, 1930. Serial No. 463,901.

My invention relates to power transmission mechanism of the general type disclosed in my Patent No. 1,697,628.

One of the objects of the present invention is to devise a smoothly acting, thoroughly reliable and frictionless means of initiating rotation of a driven element from a driving element, preparatory to the ultimate clutching together of the driving and driven shafts.

It is an object to provide such power transmission mechanism wherein the pickup of power from the driving to the driven shaft is elastic, and in which the engine is permitted to attain its most efficient operating speed without delay and without drag from the driven shafts.

It is a further object to provide in such a power transmission mechanism centrifugally controlled means for clutching together driving and driven parts, which shall be simple, compact and reliable in operation.

It is a further object generally to simplify and to make more compact and durable the mechanism of such a power transmission mechanism.

My invention comprises the novel parts and the novel combination and arrangement thereof, as shown in the accompanying drawings, described in this specification, and as will be more particularly defined by the claims terminating the same.

In the accompanying drawings, I have shown my invention in two forms which embody the several principles of my invention.

Figure 1 is an axial section through the preferred form of my device.

Figure 2 is an axial section on the line 2—2 of Figure 1, illustrating the gear arrangement.

Figure 3 is a transverse section on the line 3—3 of Figure 1, illustrating the clutch actuating mechanism.

Figures 4 and 5 are detail sectional views on the respectives lines 4—4 and 5—5 of Figure 1.

Figure 6 is an axial section similar to Figure 1 through a modified form of my device.

This transmission may be used in various ways; it is designed for use upon automobiles, wherein the load requirements vary widely because of the necessity for climbing and descending hills, and for travelling on the level at rapidly varying speeds. It is, however, adapted, for other uses, in vessels, in stationary installations and the like. Used upon automobiles, it eliminates the necessity of shifting gears, for the rate of rotation of the driven shaft will vary inversely as the load upon the motor and directly with the speed of the motor. Consequently, by supplying more fuel to the motor, the driving shaft can be speeded up, and the driven shaft will likewise be speeded up to an extent which is a function of the load, depending, for instance, upon the steepness of the hill which the automobile is climbing. All changes in speed are elastically communicated from the driving to the driven shaft.

The driving shaft is represented at 1, and the driven shaft at 2. At 3 is represented an intermediate member, which may take the form of a casing. This is formed as part of, or is secured to, the driven shaft 2, and as represented, the shaft 2 is provided with a flange 20, to which the end of the casing 3 is secured by bolts 21.

Within the casing there is provided an intermediate shaft 4, which in effect is a part of the driving shaft 1. It is formed as a separate shaft only in order that it may be speeded up, and for several purposes, among them to attain a higher speed of the intermediate shaft 4 from the driving shaft 1, various types of gearing may be employed, as I will hereafter describe. This intermediate shaft is formed with an extension 41, which is received within a bore 42 in the end of the intermediate shaft 4, and keyed thereto so that the two will rotate as one, but may be separated axially. The shaft is made in two parts, so that the gearing and its casing 30, carrying the journal of the shaft 1, may be easily disconnected from the casing 3 and associated parts, among which is the journal bearing for the intermediate shaft extension 41. The parts of the casing are secured together by bolts 31.

An internal gear 10 is secured upon the driving shaft and a small pinion 40 is carried by the end of the intermediate shaft 4, or its extension 41.

To connect the internal gear 10 and the pinion 40, I have shown a small pinion 11, supported upon a shaft 16 within and supported from the casing 30, and meshing with the internal gear 10, there being formed integral with the small gear 11 a gear 12, which meshes with a pinion 13 (see Figure 2), this pinion 13 having a larger gear 14 formed integral therewith and these two gears being secured upon a stub shaft 15 within and likewise supported from the gear casing 30. The pinion 14, in turn, meshes with the pinion 40. While one such set of gears would be sufficient, two sets may be employed, and have been so shown in Figure 2, but only one pair is shown in Figure 1, in order that the various gears may not be confused. It will be noted that the pinion 13 is not in mesh with the internal gear 10, being in a different plane.

Secured upon the intermediate shaft 4, and therefore in effect rotated by the driving shaft 1, are a set of turbine blades 5. Cooperating with them are complemental turbine blades 50 which are secured within the casing 3 to rotate therewith. The casing is at least partly filled with oil, or a similar liquid, which by centrifugal force will be held outward against the casing. This oil offers resistance to rotation of the blades 5 at high speed, and tends to cause the blades 50 to rotate. It also serves the function of lubricating parts within the casing. Rapid rotation of the blades 5, therefore, will, without contact and therefore without friction, initiate rotation of the blades 50, and therefore, of the casing 3 and the driven shaft 2, and there will be no sudden application of power to the driven shaft 2, but a smooth and elastic pickup instead.

However it is not intended that the regular driving conection between the shafts 1 and 2 should be through this turbine, but this is rather, a means of initiating the driving connection between them. Because of the high speed of the blades 5 relative to the blades 50, when the latter are stationary, it requires but little resistance to stop or tend to stop the rotation of the blades 5. In consequence of the resistance to their rotation, and the application of power to the driving shaft 1, there is a considerable force applied to the shafts 16 and 15, particularly the former. This shaft may be likened to the short arm of a lever, the long arm of which is the rapidly rotating turbine blades 5. The effect of the comparatively small resistance at the turbine is to overcome gradually the greater resistance of the casing 3 itself to turning, and finally this casing is rotating, with but little relative rotation of the turbine blades. This largely eliminates friction and heat in the turbine. The purpose of the turbine is thus seen to be to apply a resistance, elastically and not abruptly, to such a shaft as 16, carried by the casing, so that the casing shall rotate.

When the casing 3 has attained a predetermined speed, means which I will now describe are operated to effect a clutching engagement between this casing and the intermediate shaft 4, in effect, therefore, clutching together the driving shaft 1 and the driven shaft 2. Such clutch actuating means may be centrifugally operated.

A series of clutch plates 6 are supported upon a spider or disc 61 to rotate therewith, tongues 62 on the plates being receivable in grooves 63 of the disc 61. Alternated with the clutch rings 6 are clutch rings 60 which are engaged with the casing 3 to prevent relative rotation, as for instance, by seating of a bar 64 within notches 65 of the plates 60. Several such bars 64 support a backing ring or flange 66, and are themselves supported from a ring 67 carrying stub pins 76, passing through apertures in a spider or partition 36, within the casing 3 and forming a part thereof. By these, or like means, the clutch plates 6 and 60 are arranged to be pressed together by advancing the ring 67 to the left, as seen in Figure 1, to engage the several plates. Such engagement would effect clutching engagement between the intermediate shaft 4, or in effect the driving shaft 1, and the casing 3, or in effect the driven shaft 2.

Arms 7 are journaled upon trunnions 70 entering recesses 75 in the pins 76, heretofore referred to, on the one hand, and recesses 74 axially aligned with such recesses 75, the apertures 74 being formed in a spider 73 supported within the casing 3. These trunnions 70 form a pivotal support for the arms 7 outwardly of the axis of rotation of the intermediate member or casing 3. On the arms 7, adjacent this center of rotation, are weights 71. Springs 77 engage each of the arms 7, tending to hold the weights 71 in their position of rest adjacent the axis of rotation, against a stop pin 72.

As the casing 3 commences to rotate, a centrifugal force is applied to the weights 71, tending to throw them outwardly toward the dotted line positions of Figure 3, in opposition to the springs 77. This centrifugal effect increases with increase in the speed of rotation of the casing or intermediate member 3. This rotation, it will be remembered, is initiated and the speed increased by the resistance of the turbine blades 50 to rotation of the turbine blades 5. Eventually, the weights 71 fly outwardly to an extent that inclined cam surfaces at 67 upon the pins 76 and the arm 7 cause an endwise thrust of the pins 76 sufficient to effect clutching engagement between the clutch rings 6 and 60.

When this occurs the driving and driven shafts are, in effect, clutched together, and the parts may be so arranged that this clutching does not occur until the casing 3 and its driven shaft 2 have attained such a speed that the clutching engagement will produce no noticeable shock in the transmission.

Thereafter, any increased load upon the motor attached to the driving shaft 1, as for instance, by the automobile starting to climb a steeper hill, is compensated for by greater relative movement between the turbine blades 50 and 5, above the speeds where decreased rotation of the casing 3 will cause disengagement of the clutch elements 6 and 60. All changes of speed within these limits are in effect reflected from the turbine members 5 and 50.

It will be noted by following out the gear drive that the driving shaft, the casing 3, the intermediate shaft 4, the turbine blades 5 and the driven shaft 2, all rotate in the same direction, thus to a considerable extent eliminating useless friction and resistance due to inertia of parts rotating in the opposite direction.

It is believed that the operation of my device will now be clear, and I do not deem it necessary to go through the same in detail. It will accommodate itself to various conditions met with in practice automatically, and without thought or attention on the part of the driver.

In Figure 6, there has been substituted for the hydraulic pickup between the casing 3 and the intermediate shaft 4, a centrifugal clutch pickup, which operates in effect through the main clutch, and which affords another means of resisting rotation of the shaft 4 thereby reacting upon the shaft 15. Here, however, a clutch plate 6 is interposed between two clutch plates 60 and 69. The clutch plate 6 is directly secured to a collar or spider 80, slidable axially upon a sleeve 81 upon the shaft 4. Movement of the spider 80 to the left engages the clutch plate 6 with the clutch plate 69, the latter of which is connected to the member 66, rotatable with the casing 3, and such movement is under the control of flexible arms 82 carrying weights or governor balls 8. One end of the arms 82 is anchored at 83 to a collar 84 fast upon the shaft 4 and rotating therewith, while the other end of the arms 82 is connected to the spider 80.

Movement of the clutch plate 60 to the left, under the influence of the cam surfaces at 67, causes the clutch plate 60 to grip the clutch plate 6 as before, and the operation is the same, though the clutch plates 6 may also be gripped and held to the clutch plate 69.

What I claim as my invention is:

1. In combination with a driving and a driven shaft, a member connected to the driven shaft, clutch means for connecting the driving shaft with said member, means controlled by the speed of rotation of said member for actuating said clutch means, and a hydraulic means operable to rotate said member by rotation of the driving shaft.

2. The combination of claim 1, the hydraulic means comprising turbine blades upon said member, and cooperating turbine blades rotatable from the driving shaft.

3. The combination of claim 1, the clutch actuating means being pivotally mounted upon the member referred to, and centrifugally operated upon rotation of said member to engage the clutch means.

4. The combination of claim 1, the clutch actuating means comprising weighted arms pivoted upon the member referred to, means tending to hold said arms close to the axis of the member's rotation, and means operable by outward swinging of the arms to engage the clutch means.

5. In combination with a driving and a driven shaft, a member connected to the driven shaft, hydraulic pick-up means operable upon rotation of the driving shaft to initiate rotation of said member, and means solely responsible to variations in the speed of the said member, and operable upon the attainment by said member of a minimum speed, for clutching together the driving and driven shafts.

6. In combination with a driving and a driven shaft, an intermediate member connected to the driven shaft, means operable upon rotation of the driving shaft to initiate rotation of said member, radially disposed weighted arms pivoted at their outer ends on said member, upon axes parallel to the member's axis of rotation, springs normally tending to hold said arms in radial disposition, cooperating clutch members connected to the intermediate member and to the driven shaft, and cam thrust means interposed between said arms and the clutch, and operable upon outward swinging of the arms to engage the clutch members.

7. In combination with a driving and a driven shaft, a rotative casing connected to the driven shaft, an intermediate shaft journaled within said casing, means operable upon rotation of said intermediate shaft to initiate rotation of said casing, means operable upon the attainment by said casing of a predetermined minimum speed for clutching together the intermediate and driven shafts, and drive means connecting the driving and intermediate shafts comprising an internal gear upon the driving shaft, a spur gear upon the intermediate shaft, and a train of gears carried by the casing and intermeshed with the internal gear and the spur gear, to turn the intermediate shaft in the same direction as the driving shaft.

8. The combination of claim 7, the means for initiating rotation of the casing comprising turbine blades upon the intermediate shaft and cooperating turbine blades upon the casing, whereby the casing and driven shaft are turned in the same direction as the driving and intermediate shafts.

Signed at Seattle, Washington, this 21st day of June, 1930.

PETER ASMUSSEN.